(12) United States Patent
Deshpande et al.

(10) Patent No.: US 7,226,490 B2
(45) Date of Patent: Jun. 5, 2007

(54) FUEL PROCESSOR FOR PRODUCING A HYDROGEN RICH GAS

(75) Inventors: Vijay A. Deshpande, Houston, TX (US); Curtis Krause, Houston, TX (US)

(73) Assignee: Texaco, Inc., San Ramon, CA (US)

( * ) Notice: Subject to any disclaimer, the term of this patent is extended or adjusted under 35 U.S.C. 154(b) by 524 days.

(21) Appl. No.: 10/006,879

(22) Filed: Dec. 5, 2001

(65) Prior Publication Data

US 2002/0083646 A1 Jul. 4, 2002

Related U.S. Application Data

(60) Provisional application No. 60/251,226, filed on Dec. 5, 2000.

(51) Int. Cl.
*B01J 8/00* (2006.01)

(52) U.S. Cl. .................... 48/127.9; 48/93; 422/191; 422/211

(58) Field of Classification Search .................. 48/75, 48/63, 64, 102 R, 105, 107, 102 A, 93–95, 48/211–213, 127.9, 198.1, 198.3, 198.7, 128, 48/214 R, 215, 214 A; 422/188–191, 193–195, 422/198, 211, 204, 222, 234, 235
See application file for complete search history.

(56) References Cited

U.S. PATENT DOCUMENTS

| | | | |
|---|---|---|---|
| 3,572,046 A | 3/1971 | Grotz | |
| 3,653,846 A | 4/1972 | Kubec et al. | |
| 3,720,602 A | 3/1973 | Riley et al. | |
| 3,729,936 A | 5/1973 | De Palma et al. | |
| 3,838,994 A | 10/1974 | Aldridge | |
| 3,909,299 A | 9/1975 | Corrigan | |
| 3,976,507 A * | 8/1976 | Bloomfield | 429/17 |
| 3,996,016 A | 12/1976 | Wagner | |
| 4,190,641 A * | 2/1980 | Preston, Jr. | 423/653 |
| 4,363,654 A | 12/1982 | Frederick et al. | 75/34 |
| 4,522,894 A | 6/1985 | Hwang et al. | 429/17 |
| 4,863,707 A * | 9/1989 | McShea, III et al. | 423/359 |
| 4,876,409 A | 10/1989 | Leyshon et al. | |
| 4,976,747 A | 12/1990 | Szydlowski et al. | 48/127.9 |
| 5,132,007 A | 7/1992 | Meyer et al. | 208/427 |
| 5,209,906 A | 5/1993 | Watkins et al. | |
| 5,248,566 A | 9/1993 | Kumar et al. | 429/19 |
| 5,330,727 A | 7/1994 | Trocciola et al. | |
| 5,360,679 A * | 11/1994 | Buswell et al. | 429/19 |

(Continued)

*Primary Examiner*—Basia Ridley
(74) *Attorney, Agent, or Firm*—Howrey LLP; Frank C. Turner; Melissa Patangia

(57) ABSTRACT

An apparatus for converting hydrocarbon fuel to a hydrogen rich gas including a first heat exchanger for heating the hydrocarbon fuel, a first desulfurization reactor for reacting a heated hydrocarbon fuel to produce a substantially desulfurized hydrocarbon fuel, a manifold for mixing the substantially desulfurized hydrocarbon fuel with an oxygen containing gas to produce a fuel mixture, a second heat exchanger for heating the fuel mixture, an autothermal reactor including a catalyst for reacting the heated fuel mixture to produce a first hydrogen containing gaseous mixture, a second desulfurization reactor for producing a second hydrogen containing gaseous mixture that is substantially desulfurized, a water gas shift reactor for reacting the second hydrogen containing gaseous mixture to produce a third hydrogen containing gaseous mixture with a substantially decreased carbon monoxide content, and a selective oxidation reactor for reacting the third hydrogen containing gaseous mixture to produce the hydrogen rich gas.

12 Claims, 2 Drawing Sheets

U.S. PATENT DOCUMENTS

| | | | |
|---|---|---|---|
| 5,385,712 A | 1/1995 | Sprunk | |
| 5,656,494 A | 8/1997 | Kant et al. | |
| 5,725,756 A | 3/1998 | Subramaniam et al. | |
| 5,840,270 A * | 11/1998 | Werth | 423/658 |
| 5,874,051 A | 2/1999 | Heil et al. | 422/171 |
| 5,997,594 A | 12/1999 | Edlund et al. | 48/76 |
| 6,063,515 A * | 5/2000 | Epp et al. | 429/17 |
| 6,086,839 A | 7/2000 | Autenrieth et al. | 423/350 |
| 6,238,815 B1 | 5/2001 | Skala et al. | 429/17 |
| 6,033,793 A1 | 3/2002 | Woods et al. | |
| 2002/0088740 A1 | 7/2002 | Krause et al. | |
| 2002/0090326 A1 | 7/2002 | Deshpande | |
| 2002/0090327 A1 | 7/2002 | Deshpande | |
| 2002/0090328 A1 | 7/2002 | Deshpande | |
| 2002/0090334 A1 | 7/2002 | Stevens et al. | |
| 2002/0094310 A1 | 7/2002 | Krause et al. | |
| 2002/0098129 A1 | 7/2002 | Martin et al. | |

* cited by examiner

FUEL PROCESSOR FOR PRODUCING A HYDROGEN RICH GAS

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Despite the above work, there remains a need for a simple unit for converting a hydrocarbon fuel to a hydrogen rich gas stream for use in conjunction with a fuel cell.

SUMMARY OF THE INVENTION

The present invention is generally directed to an apparatus and method for converting hydrocarbon fuel into a hydrogen rich gas. In one illustrative embodiment, the fuel processor of the present invention includes a heat exchanger for heating the hydrocarbon fuel feed prior to entering a desulfurization reactor. The substantially desulfurized hydrocarbon fuel is then mixed in a manifold with an oxygen containing gas to produce a fuel mixture. This fuel mixture is then heated in another heat exchanger before being fed to an autothermal reforming reactor. The resulting hydrogen containing gaseous mixture is then fed to a second desulfurization reactor before being fed to a water gas shift reactor which substantially decreases the carbon monoxide content of the hydrogen containing gaseous mixture. Finally, a selective oxidation reactor can be utilized to produce the hydrogen rich gas.

In another illustrative embodiment, the method of the present invention can be utilized for converting hydrocarbon fuel into a hydrogen rich gas by first heating the hydrocarbon fuel to produce a heated hydrocarbon fuel before reacting the heated hydrocarbon fuel in the presence of a catalyst under desulfurization conditions to produce a substantially desulfurized hydrocarbon fuel. The fuel can then be mixed with an oxygen containing gas to produce a fuel mixture. The fuel mixture is then heated before reacting in the presence of a catalyst under autothermal reforming conditions to produce a hydrogen containing gaseous mixture. This mixture is then reacted in the presence of a catalyst under desulfurization conditions to produce a substantially desulfurized hydrogen containing gaseous mixture, which can be further reacted under water gas shift reaction conditions to produce a hydrogen containing gaseous mixture with a carbon monoxide content less than 50 ppm. Finally, this hydrogen stream can be reacted in the presence of a catalyst under selective oxidation reaction conditions of to produce the hydrogen rich gas product.

BRIEF DESCRIPTION OF THE DRAWINGS

The description is presented with reference to the accompanying drawings in which.

DESCRIPTION OF ILLUSTRATIVE EMBODIMENTS

The present invention is generally directed to an apparatus for converting hydrocarbon fuel into a hydrogen rich gas. In a preferred aspect, the apparatus and method described herein relate to a compact processor for producing a hydrogen rich gas stream from a hydrocarbon fuel for use in fuel cells. However, other possible uses are contemplated for the apparatus and method described herein, including any use wherein a hydrogen rich stream is desired. Accordingly, while the invention is described herein as being used in conjunction with a fuel cell, the scope of the invention is not limited to such use.

Each of the illustrative embodiments of the present invention describe a fuel processor or a process for using such a fuel processor with the hydrocarbon fuel feed being directed through the fuel processor. The hydrocarbon fuel may be liquid or gas at ambient conditions. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream from of the present invention includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
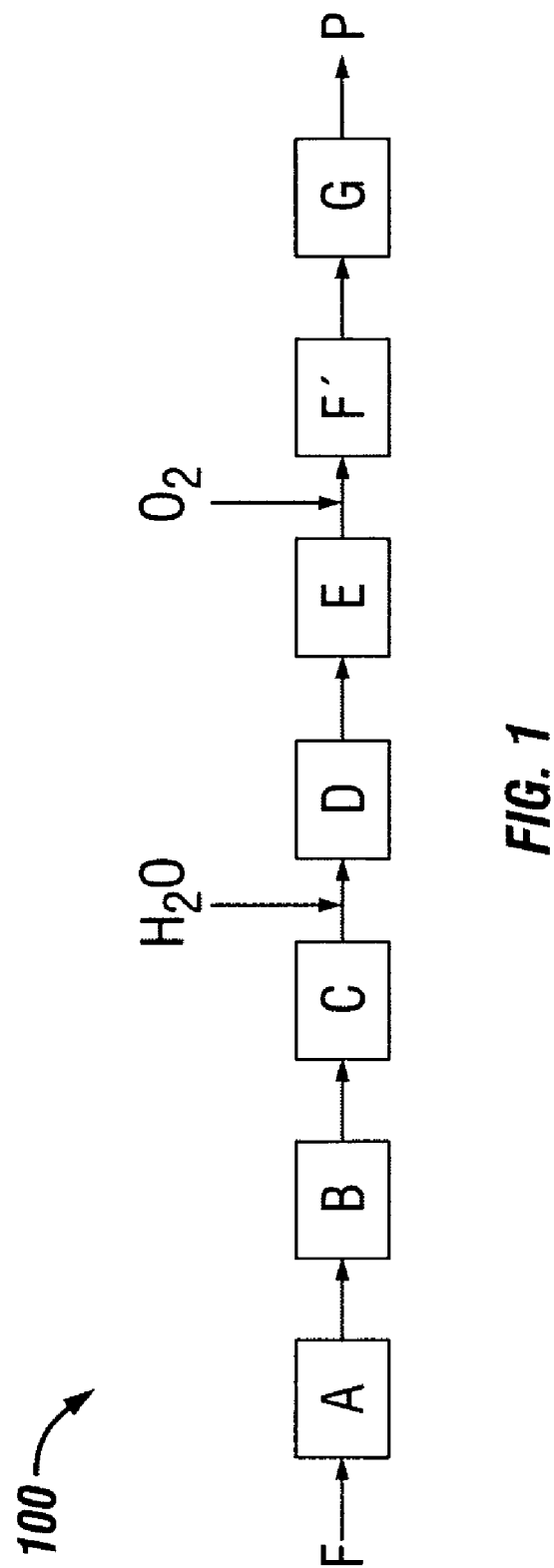
FIG. 1 depicts a simple process flow diagram for one illustrative embodiment of the present invention.

FIG. 1 depicts a general process flow diagram illustrating the process steps included in the illustrative embodiments of the present invention. One of skill in the art should appreciate that a certain amount of progressive order is needed in the flow of the reactants through the reactors disclosed herein.

Process step A is an autothermal reforming process in which two reactions, partial oxidation (formula I, below) and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

The partial oxidation reaction occurs very quickly to the complete conversion of oxygen added and produces heat. The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C. to about 900° C., depending on the feed conditions and the catalyst. The invention uses a catalyst bed of a partial oxidation catalyst with or without a steam reforming catalyst. The catalyst may be in any form including pellets, spheres, extrudate, monoliths, and the like. Partial oxidation catalysts should be well known to those with skill in the art and are often comprised of noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. One illustrative embodiment for step B is the use of a heat exchanger utilizing feed stream F as the coolant circulated through the heat exchanger. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is sulfur, which is converted by the autothermal reforming process of process step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \qquad (III)$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O + CO \rightarrow H_2 + CO_2 \qquad (IV)$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F' is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F'. The oxygen is consumed by the reactions of process step G described below. The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \tag{V}$$

$$H_2 + \tfrac{1}{2}O_2 \rightarrow H_2O \tag{VI}$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with of higher and lower levels of carbon monoxide.

The effluent exiting the fuel processor is a hydrogen rich gas P containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

One illustrative embodiment of the present invention is depicted. Fuel processor 100 of the present invention contains a series of process units for carrying out the general process as described in FIG. 1. It is intended that the process units may be used in numerous configurations as is readily apparent to one skilled in the art. Furthermore, the fuel processor described herein is adaptable for use in conjunction with a fuel cell such that the hydrogen rich product gas of the fuel processor described herein is supplied directly to a fuel cell as a feed stream.

The process equipment described herein may be fabricated from any material capable of withstanding the operating conditions and chemical environment of the reactions described herein and can include, for example, carbon steel, stainless steel, INCONEL® (a trademark registered for use in association with nickel alloys and alloys of nickel, chromium and iron), Incoloy, Hastelloy, and the like. The operating pressure for the process units are preferably from about 0 to about 100 psig, although higher pressures may be employed. Ultimately, the operating pressure of the fuel processor depends upon the delivery pressure required by the users of the product hydrogen, namely a fuel cell. For fuel cells operating in the 1 to 20 kW range an operating pressure of 0 to about 100 psig is generally sufficient.

Figure 2:
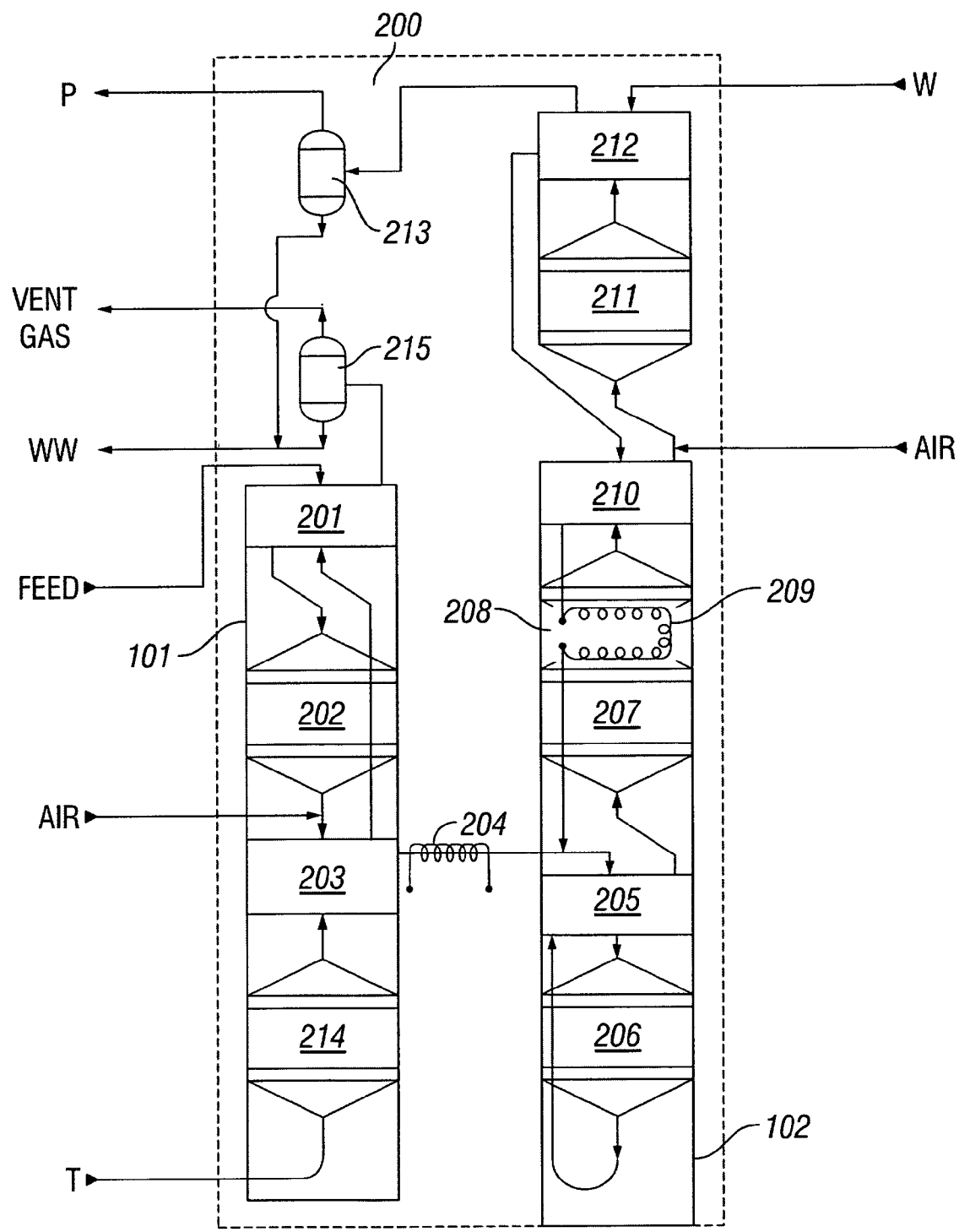
FIG. 2 illustrates one embodiment of a fuel processor of the present invention.

Fuel processor 200 as shown in FIG. 2 similar to the process diagrammatically illustrated in FIG. 1 and described supra. Hydrocarbon fuel feed stream F is introduced to the fuel processor and hydrogen rich product gas P is drawn off. Fuel processor 200 includes several process units that each perform a separate operational function and is generally configured as shown in FIG. 2. In this illustrative embodiment, the hydrocarbon fuel feed enters the first compartment 101 into spiral exchanger 201, which preheats the feed against fuel cell tail gas T (enters fuel processor 200 at reactor 214). Because of the multiple exothermic reactions that take place within the fuel processor, one of skill in the art should appreciate that several other heat integration opportunities are also plausible in this service. This preheated feed then enters desulfurization reactor 202 through a concentric diffuser for near-perfect flow distribution and low pressure drop at the reactor inlet. Reactor 202 contains a desulfurizing catalyst and operates as described in process step C of FIG. 1. Note that this step does not accord with the order of process steps as presented in FIG. 1. This is a prime example of the liberty that one of skill in the art may exercise in optimizing the process configuration in order to process various hydrocarbon fuel feeds and/or produce a more pure product. Desulfurized fuel from reactor 202 is then collected through a concentric diffuser and mixed with air, with the mixture being routed to exchanger 203. In this illustrative embodiment, exchanger 203 is a spiral exchanger that heats this mixed fuel/air stream against fuel cell tail gas T (enters fuel processor 200 at reactor 214).

The preheated fuel/air mixture then enters the second compartment 102, with the preheat temperature maintained or increased by electric coil heater 204 located between the two compartments. The preheated fuel-air mixture enters spiral exchanger 205, which preheats the stream to autothermal reforming reaction temperature against the autothermal reformer 206 effluent stream. Preheated water (enters fuel processor 200 at exchanger 212) is mixed with the preheated fuel-air stream prior to entering exchanger 205.

The preheated fuel-air-water mixture leaves exchanger 205 through a concentric diffuser and is then fed to autothermal reformer (ATR) 206, which corresponds to process step A of FIG. 1. The diffuser allows even flow distribution at the ATR 206 inlet. The hot hydrogen product from ATR 206 is collected through a concentric diffuser and routed back to exchanger 205 for heat recovery. In this embodiment, exchanger 205 is mounted directly above ATR 206 in order to minimize flow path, thereby reducing energy losses and improving overall energy efficiency. Flow conditioning vanes can be inserted at elbows in order to achieve low pressure drop and uniform flow through ATR 206.

The cooled hydrogen product from exchanger 205 is then routed through a concentric diffuser to desulfurization reactor 207, which corresponds to process step C of FIG. 1. The desulfurized product is then fed to catalytic shift reactor 208, which corresponds with Process Step E in FIG. 1. Cooling coil 209 is provided to control the exothermic shift reaction temperature, which improves CO conversion leading to higher efficiency. In this embodiment, cooling coil 209 also preheats ATR 206 feed, further improving heat recovery and fuel cell efficiency. The shift reaction product is then collected through a concentric diffuser and is cooled in spiral exchanger 210, which also preheats water feed W.

Air is then introduced to the cooled shift reaction product, which is then routed to a concentric diffuser feeding preferred CO oxidation reactor 211. Reactor 211 oxidizes trace CO to $CO_2$, which corresponds to process step G in FIG. 1. Flow conditioning vanes may be inserted at elbows to achieve short flow paths and uniform low pressure drop throughout reactor 211. The effluent purified hydrogen stream is then collected in a concentric diffuser and is sent to exchanger 212 which recovers heat energy into the water feed W. The cooled hydrogen stream is then flashed in separator 213 to remove excess water WW. The hydrogen gas stream P from separator 213 is then suitable for hydrogen users, such as a fuel cell.

In the embodiment described in FIG. 2, the combined anode and cathode vent gas streams from a fuel cell are introduced to fuel processor 200 for heat recovery from the unconverted hydrogen in the fuel cell. Integration of the fuel cell with the fuel processor considerably improves the overall efficiency of electricity generation from the fuel cell. The fuel cell tail gas T flows through a concentric diffuser to anode tail gas oxidizer (ATO) 214. Hydrogen, and possibly a slip stream of methane and other light hydrocarbons are catalytically oxidized according to:

$$CH_4 + 2O_2 \rightarrow CO_2 + 2H_2O \quad \text{(VII)}$$

$$H_2 + \tfrac{1}{2}O_2 \rightarrow H_2O \quad \text{(VIII)}$$

Equations VII and VIII take place in ATO 214, which can be a fixed bed reactor composed of catalyst pellets on beads, or preferably a monolithic structured catalyst. The hot reactor effluent is collected through a concentric diffuser and is routed to exchanger 203 for heat recovery with the combined fuel/air mixture from reactor 202. Heat from the fuel cell tail gas stream T is then further recovered in exchanger 201 before being being flashed in separator 215. The separated water is connected to the processor effluent water stream WW and the vent gas is then vented to the atmosphere.

Such a skilled person in the art should also appreciate that the present invention also encompasses the following illustrative embodiments. One such illustrative embodiment is an apparatus for converting hydrocarbon fuel into a hydrogen rich gas, comprising a manifold for mixing the hydrocarbon fuel with an oxygen-containing gas to give a fuel mixture, an autothermal reactor including a catalyst for reacting the fuel mixture under autothermal reforming conditions to give a hydrogen containing gaseous mixture, a water gas shift reactor including a catalyst for reacting the hydrogen containing gaseous mixture under water gas shift reaction conditions to give an intermediate hydrogen containing gaseous mixture with a substantially reduced carbon monoxide content, and a selective oxidation reactor including a catalyst for reacting the intermediate hydrogen containing gaseous mixture under selective oxidation reaction conditions to produce the hydrogen rich gas. A preferred aspect of this embodiment includes a heat exchanger for heating the hydrocarbon fuel prior to feeding the hydrocarbon fuel feed to the manifold. Another preferred aspect of this embodiment is a desulfurization reactor including a catalyst for reacting the heated hydrocarbon fuel under desulfurization conditions to produce a substantially desulfurized hydrocarbon fuel feed to the manifold. Yet another preferred aspect of this embodiment includes a heat exchanger for heating the fuel mixture prior to feeding the autothermal reactor. Yet another preferred aspect of this embodiment includes another desulfurization reactor including a catalyst for reacting the hydrogen containing gaseous mixture under desulfurization conditions to produce a substantially desulfurized hydrogen containing gaseous mixture feed to the water gas shift reactor. Yet another preferred aspect of this embodiment is an anode tail gas oxidizer including a catalyst for reacting the unconverted hydrogen from a fuel cell under oxidation conditions to create a hot anode tail gas oxidizer effluent. This hot anode tail gas oxidizer effluent can be used to heat integrate with the process and improve the overall energy efficiency of the apparatus.

Another illustrative embodiment is an apparatus for converting hydrocarbon fuel into a hydrogen rich gas, comprising a first heat exchanger for heating the hydrocarbon fuel to produce a heated hydrocarbon fuel, a first desulfurization reactor for reacting the heated hydrocarbon fuel to produce a substantially desulfurized hydrocarbon fuel, a manifold for mixing the substantially desulfurized hydrocarbon fuel with an oxygen containing gas to produce a fuel mixture, a second heat exchanger for heating the fuel mixture to produce a heated fuel mixture, an autothermal reactor including a catalyst for reacting the heated fuel mixture to produce a first hydrogen containing gaseous mixture, a second desulfurization reactor for reacting the first hydrogen containing gaseous mixture to produce a second hydrogen containing gaseous mixture that is substantially desulfurized, a water gas shift reactor for reacting the second hydrogen containing gaseous mixture to produce a third hydrogen containing gaseous mixture with a substantially decreased carbon monoxide content, and a selective oxidation reactor for reacting the third hydrogen containing gaseous mixture to produce the hydrogen rich gas. Yet another preferred aspect of this embodiment is an anode tail gas oxidizer including a catalyst for reacting the unconverted hydrogen from a fuel cell under oxidation conditions to create a hot anode tail gas oxidizer effluent. This hot anode tail gas oxidizer effluent can be used to heat integrate with the process and improve the overall energy efficiency of the apparatus.

Yet another illustrative embodiment of the present invention is a process for converting hydrocarbon fuel into a hydrogen rich gas by mixing the hydrocarbon fuel with an oxygen containing gas to produce a fuel mixture, then reacting the fuel mixture in the presence of a catalyst under autothermal reforming reaction conditions to produce a hydrogen containing gaseous mixture, then reacting the hydrogen containing gaseous mixture in the presence of a catalyst under water gas shift reaction conditions to produce an intermediate hydrogen containing gaseous mixture with a substantially reduced carbon monoxide content, and then reacting the intermediate hydrogen containing gaseous mixture in the presence of a catalyst under selective oxidation conditions to produce the hydrogen rich gas. A preferred aspect of this embodiment includes heating the hydrocarbon fuel before the mixing step. Another preferred aspect of this embodiment is reacting the heated hydrocarbon fuel in the presence of a catalyst under desulfurization conditions to substantially desulfurized the hydrocarbon fuel prior to the mixing step. Yet another preferred aspect of this embodiment includes heating the fuel mixture prior to the first reaction step. Another preferred aspect of this embodiment includes reacting the hydrogen containing gaseous mixture in the presence of a catalyst under desulfurization reaction conditions to substantially desulfurized the hydrogen containing gaseous mixture prior to the second reaction step. It is intended that this embodiment be able to reduce the carbon monoxide concentration in the hydrogen rich gas to less than 50 ppm. Yet another preferred aspect of this embodiment is utilizing an anode tail gas oxidizer including a catalyst for reacting the unconverted hydrogen from a fuel cell under oxidation conditions to create a hot anode tail gas oxidizer effluent. This hot anode tail gas oxidizer effluent can be used to heat integrate with the process and improve the overall energy efficiency of the apparatus.

Yet another illustrative embodiment of the present invention is a method for converting hydrocarbon fuel into a hydrogen rich gas by heating the hydrocarbon fuel to produce a heated hydrocarbon fuel, then reacting the heated hydrocarbon fuel in the presence of a catalyst under desulfurization conditions to produce a substantially desulfurized hydrocarbon, then mixing the substantially desulfurized hydrocarbon with an oxygen containing gas to produce a fuel mixture, then heating the fuel mixture to produce a heated fuel mixture, then reacting the heated fuel mixture in the presence of a catalyst under auto thermal reforming conditions to produce a first hydrogen containing gaseous mixture, then reacting the first hydrogen containing gaseous mixture in the presence of a catalyst under desulfurization conditions to produce a second hydrogen containing gaseous mixture that is substantially desulfurized, then reacting the second hydrogen containing gaseous mixture with a catalyst under water gas shift reaction conditions to produce a third hydrogen containing gaseous mixture with a substantially reduced carbon monoxide content, and then reacting the third hydrogen containing gaseous mixture in the presence of a catalyst under selective oxidation reaction conditions of to produce the hydrogen rich gas. It is intended that this embodiment be able to reduce the carbon monoxide concentration in the hydrogen rich gas to less than 50 ppm. Yet another preferred aspect of this embodiment is utilizing an anode tail gas oxidizer including a catalyst for reacting the unconverted hydrogen from a fuel cell under oxidation conditions to create a hot anode tail gas oxidizer effluent. This hot anode tail gas oxidizer effluent can be used to heat integrate with the process and improve the overall energy efficiency of the apparatus.

While the apparatus and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention.

What is claimed is:

1. An apparatus for converting hydrocarbon fuel into a hydrogen rich gas comprising:
    a heat exchanger for heating a hydrocarbon fuel into a heated hydrocarbon fuel;
    a desulfurization reactor including a catalyst for reacting the heated hydrocarbon fuel under desulfurization conditions to produce a substantially desulfurized hydrocarbon fuel, wherein the hydrocarbon fuel becomes a hydrocarbon fuel feed to a manifold;
    a manifold for mixing the substantially desulfurized hydrocarbon fuel with an oxygen containing gas to give a fuel mixture;
    an autothermal reactor including a catalyst for reacting the fuel mixture under autothermal reforming conditions to give a hydrogen containing gaseous mixture;
    a water gas shift reactor including a catalyst for reacting the hydrogen containing gaseous mixture under water gas shift reaction conditions to give an intermediate hydrogen containing gaseous mixture with a substantially reduced carbon monoxide content; and
    a selective oxidation reactor including a catalyst for reacting the intermediate hydrogen containing gaseous mixture under selective oxidation reaction conditions to produce the hydrogen rich gas;
    wherein the heat exchanger and the desulfurization reactor are disposed in a first compartment and the autothermal reactor is disposed in a second compartment.

2. The apparatus according to claim 1, further comprising a heat exchanger for heating the fuel mixture to produce a heated fuel mixture, wherein the heated fuel mixture becomes the fuel mixture feed to the autothermal reactor.

3. The apparatus according to claim 2, further comprising a desulfurization reactor including a catalyst for reacting the hydrogen containing gaseous mixture under desulfurization conditions to produce a substantially desulfurized hydrogen containing gaseous mixture, wherein the substantially desulfurized hydrogen containing gaseous mixture becomes the hydrogen containing gaseous mixture feed to the water gas shift reactor.

4. The apparatus according to claim 1, wherein the hydrocarbon fuel is selected from the group consisting of natural gas, methane, ethane, propane, butane, liquefied petroleum gas, naphtha, gasoline, kerosene, diesel, methanol, ethanol, propanol, and combinations thereof.

5. The apparatus according to claim 1, wherein the hydrogen rich gas contains less than 50 ppm of carbon monoxide.

6. The apparatus according to claim 1, further comprising an anode tail gas oxidizer including a catalyst for reacting the unconverted hydrogen from a fuel cell under oxidation conditions to create a hot anode tail gas oxidizer effluent.

7. The apparatus according to claim 6, wherein the hot anode tail gas oxidizer effluent is heat integrated with the apparatus.

8. An apparatus for converting hydrocarbon fuel into a hydrogen rich gas comprising:
    a first heat exchanger for heating the hydrocarbon fuel to produce a heated hydrocarbon fuel;
    a first desulfurization reactor for reacting the heated hydrocarbon fuel to produce a substantially desulfurized hydrocarbon fuel; a manifold for mixing the substantially desulfurized hydrocarbon fuel with an oxygen containing gas to produce a fuel mixture;

a second heat exchanger for heating the fuel mixture to produce a heated fuel mixture;

an autothermal reactor including a catalyst for reacting the heated fuel mixture to produce a first hydrogen containing gaseous mixture;

a second desulfurization reactor for reacting the first hydrogen containing gaseous mixture to produce a second hydrogen containing gaseous mixture that is substantially desulfurized;

a water gas shift reactor for reacting the second hydrogen containing gaseous mixture to produce a third hydrogen containing gaseous mixture with a substantially decreased carbon monoxide content; and a selective oxidation reactor for reacting the third hydrogen containing gaseous mixture to produce the hydrogen rich gas;

wherein the first heat exchanger and the first desulfurization reactor are disposed in a first compartment and the autothermal reactor is disposed in a second compartment.

9. The apparatus according to claim 8, wherein the hydrocarbon fuel is selected from the group consisting of natural gas, methane, ethane, propane, butane, liquefied petroleum gas, naphtha, gasoline, kerosene, diesel, methanol, ethanol, propanol, and combinations thereof.

10. The apparatus according to claim 8, wherein the hydrogen rich gas contains less than 50 ppm of carbon monoxide.

11. The apparatus according to claim 8, further comprising an anode tail gas oxidizer including a catalyst for reacting the unconverted hydrogen from a fuel cell under oxidation conditions to create a hot anode tail gas oxidizer effluent.

12. The apparatus according to claim 11, wherein the hot anode tail gas oxidizer effluent is heat integrated with the apparatus.

* * * * *